United States Patent
Firoozabadi et al.

(10) Patent No.: US 11,236,593 B2
(45) Date of Patent: Feb. 1, 2022

(54) METHOD OF EXTRACTING OIL USING A FUNCTIONAL MOLECULE

(71) Applicant: North Oil Company, Doha (QA)

(72) Inventors: Abbas Firoozabadi, Palo Alto, CA (US); Mayur Pal, Doha (QA); Taniya Kar, Palo Alto, CA (US)

(73) Assignee: KASHABLE LLC, New York, NY (US)

( * ) Notice: Subject to any disclaimer, the term of this patent is extended or adjusted under 35 U.S.C. 154(b) by 0 days.

(21) Appl. No.: 16/838,036

(22) Filed: Apr. 2, 2020

(65) Prior Publication Data

US 2021/0310343 A1 Oct. 7, 2021

(51) Int. Cl.
*E21B 43/16* (2006.01)
*C09K 8/584* (2006.01)

(52) U.S. Cl.
CPC ............ *E21B 43/162* (2013.01); *C09K 8/584* (2013.01)

(58) Field of Classification Search
CPC .............................. E21B 43/162; C09K 8/584
See application file for complete search history.

(56) References Cited

U.S. PATENT DOCUMENTS

| | | | | |
|---|---|---|---|---|
| 4,008,768 A * | 2/1977 | Birk | ........................ | C09K 8/584 166/270.1 |
| 4,596,653 A * | 6/1986 | Graham | ................. | C08G 77/46 208/188 |
| 7,789,144 B2 | 9/2010 | Dahanayake et al. | | |
| 2009/0065204 A1 * | 3/2009 | Dahanayake | .......... | C09K 8/584 166/270.1 |
| 2010/0012331 A1 * | 1/2010 | Larter | ................... | E21B 43/243 166/401 |
| 2010/0096129 A1 * | 4/2010 | Hinkel | .................... | E21B 43/16 166/270.1 |
| 2012/0186810 A1 * | 7/2012 | Dahanayake | .......... | C09K 8/584 166/263 |
| 2013/0037265 A1 * | 2/2013 | Chabert | ................. | C09K 8/584 166/270.1 |
| 2014/0042058 A1 * | 2/2014 | Janssen | .................... | C09K 8/58 208/188 |
| 2015/0247392 A1 * | 9/2015 | Portwood | ................ | C09K 8/50 166/305.1 |

(Continued)

FOREIGN PATENT DOCUMENTS

CN 107794019 A 3/2018

OTHER PUBLICATIONS

Guerithault, Raphael, and Christine A. Ehlig-Economides. "Single-Well Waterflood Strategy for Accelerating Oil Recovery." Paper presented at the SPE Annual Technical Conference and Exhibition, New Orleans, Louisiana, Sep. 2001. doi: https://doi.org/10.2118/71608-MS. (Year: 2001).*

(Continued)

*Primary Examiner* — Crystal J Miller
(74) *Attorney, Agent, or Firm* — Hassan Abbas Shakir; Shakir Law PLLC

(57) ABSTRACT

A method of extracting oil from a subsurface reservoir includes the steps of accessing the subsurface reservoir by means of a well, injecting a waterflooding composition comprising water and a functional molecule, into the subsurface reservoir through the well, altering the interfacial viscoelasticity, and extracting the oil through the well.

10 Claims, 2 Drawing Sheets

(56) References Cited

U.S. PATENT DOCUMENTS

2016/0024372 A1* 1/2016 Fathi Najafabadi .... E21B 43/26
166/250.02

OTHER PUBLICATIONS

Aslan, S., Najafabadi, N. F., and Firoozabadi, A. 2016. Non-monotonicity of the Contact Angle from NaCl and MgCl2 Concentrations in Two Petroleum Fluids on Atomistically Smooth Surfaces. Energy Fuels 30 (4): 2858-2864.
Bartels, W. B., Mahani, H., Berg, S., Hassanizadeh, S. M. 2019. Literature review of low salinity waterflooding from a length and time scale perspective. Fuel, 236, 338-353.
Bidhendi, M. M., Garcia-Olvera, G., Morin, B. 2018. Interfacial viscoelasticity of crude oil/brine: an alternative enhanced-oil-recovery mechanism in smart waterflooding. SPE J. 23(3): 803-818. SPE-169127-PA.
Brooks, C. F., Fuller, G. G., Frank, C. W., Robertson, C. R. 1999. An interfacial stress rheometer to study rheological transitions in monolayers at the air-water interface. Langmuir, 15(7), 2450-2459.
Chávez-Miyauchi, T. E., Firoozabadi, A., Fuller, G. G. 2016. Nonmonotonic elasticity of the crude oil-brine interface in relation to improved oil recovery. Langmuir, 32(9), 2192-2198.
Chávez-Miyauchi, T.E., Lu, Y., Firoozabadi, A. 2017. Low salinity water injection: effect of acid and base functionality on recovery performance. SPE Annual Technical Conference and Exhibition, San Antonio, Texas, Oct. 9-11. SPE-187275-MS.
Pal, M., Tarsauliya, G., Patil, P., Rohilla, N., Mounzer, H., Bacaud, B., . . . Rozwski, P. 2019. Dreaming Big "Surfactant Injection in a Giant Offshore Carbonate Field", From Successful Injection Trials to Pilot Design and Implementation.In IOR 2019—20th European Symposium on Improved Oil Recovery.
Reilly, T., Medina, B., Lehmann, T., Alvarado, V. Sep. 2018. Select naphthenic acids beneficially impact oil-water dynamics during smart waterflooding. In SPE Annual Technical Conference and Exhibition. Society of PetroleumEngineers. SPE-191455-MS.
Cho, H., Kar, T., Firoozabadi, A. 2019. Effect of Interface Elasticity and Wettability on Improved Oil Recovery in a Carbonate Rock from Low Salinity and a Demulsifier Molecule at 100 ppm. SPE Journal. Paper in Review. ManuscriptID: SJ-1218-0065.
Lee, S. Y., Webb, K. J., Collins, I., Lager, A., Clarke, S., O'Sullivan, M., . . . , Wang, X. 2010. Low salinity oil recovery: increasing understanding of the underlying mechanisms. In SPE improved oil recovery symposium. SPE-129722-MS.
Lu, Y., Najafabadi, N. F., Firoozabadi, A. 2017. Effect of temperature on wettability of oil/brine/rock systems. Energy& Fuels, 31(5), 4989-4995.
Stalder, A. F., Kulik, G., Sage, D., Barbieri, L., Hoffmann, P. 2006. A snake-based approach to accurate determination of both contact points and contact angles, Colloids and Surfaces A: Physicochemical and Engineering Aspects, 286 (1-3),92-103.
Stalder, A. F., Melchior, T., Müller, M., Sage, D., Blu, T., Unser, M. 2010. Low-bond axisymmetric drop shape analysisfor surface tension and contact angle measurements of sessile drops, Colloids and Surfaces A: Physicochemical andEngineering Aspects, 364(1-3), 72-81.
Tang, G. Q., Morrow, N. R. 1997. Salinity, temperature, oil composition, and oil recovery by waterflooding. SPE Reservoir Engineering, 12(04), 269-276. SPE-36680-PA.
Yousef, A. A., Al-Saleh, S. H., Al-Kaabi, A., Al-Jawfi, M. S. 2011. Laboratory investigation of the impact of injection-water salinity and ionic content on oil recovery from carbonate reservoirs. SPE Reservoir Evaluation & Engineering,14 (05), 578-593. SPE-137634-PA.
Taniya Kar; Tomás-Eduardo Chávez-Miyauchi, Abbas Firoozabadi, ; Mayur Pal; "A New Process for Improved Oil Recovery from Water Injection by aFunctional Molecule at 100 ppm Concentration", paper presented presentation at the SPE Annual Technical Conference and Exhibition held in Calgary, Alberta, Canada, Sep. 30-Oct. 2, 2019.
Internet Page of Abstract for Presentation of "Crude Oil—Water Interfacial Viscoelasticity in Waterflooding Performance" given by Tomás-Eduardo Chávez-Miyauchi, Abbas Firoozabadi and Gerald G. Fuller on Nov. 10, 2015 at 2015 AICHE Annual Meeting, Internet page archived at web.archive.org/web/20151210054939/ https://aiche.confex.com/aiche/2015/webprogram/Paper434010.html on Dec. 10, 2015.
Article "Improved Oil Recovery in Carbonates by Ultralow Concentration of Functional Molecules in Injection Water through an Increase in Interfacial Viscoelasticity", authored by Taniya Kar, Tomas-Eduardo Chavez-Miyauchi, Abbas Firoozabadi, and Mayur Pal, Published American Chemical Society on Sep. 22, 2020, Langmuir 2020, 36, 12160-12167.

* cited by examiner

| Experimental Conditions | Example 1 | Example 2 | Example 3 | Example 4 | Example 5 | Comparative Example 1 | Comparative Example 2 |
|---|---|---|---|---|---|---|---|
| Demulsifier | Prochinor® | Prochinor® | Prochinor® | Prochinor® | Emulsotron X-8672® | NA | NA |
| Pressure | 200 psi | 200 psi | 200 psi | 200 psi | 200 psi | 200 psi | 200 psi |
| Temperature | 60°C | 60°C | 60°C | 60°C | 60°C | 60°C | 60°C |
| Salt Concentration | 40,000 | 0 | 40,000 | 40,000 | 40,000 | 40,000 | 0 |
| Demulsifier Concentration | 100 | 100 | 200 | 250 | 100 | 0 | 0 |
| Phase angle | 14° | 14.5° | - | - | - | 18.9° | 23.3° |
| Interfacial Tension | 1.0 mN/m | - | - | - | - | 5.4 mN/m | - |
| Contact Angle | 71.9° | 41.1° | - | - | - | 77.1° | 43.3° |

Fig. 2

METHOD OF EXTRACTING OIL USING A FUNCTIONAL MOLECULE

BACKGROUND OF THE INVENTION

1. Field of the Invention

The present invention relates to a method of extracting oil from a subsurface reservoir. More specifically, the invention relates to a method of extracting oil from a subsurface reservoir by injecting a waterflooding composition into the subsurface reservoir.

2. Discussion of the Related Art

Methods of extracting oil from subsurface reservoirs are known in the art. More specifically, methods of extracting oil from a subsurface reservoir by injecting water into the reservoir, are being used to extract oil from oil reservoirs. The water that is injected into the oil reservoir may contain additives.

U.S. Pat. No. 7,789,144B2 describes a method of flooding an oil reservoir for oil recovery. The method includes the steps of introducing a flooding fluid into the reservoir, along with a non-polymeric viscoelastic surfactant.

Chinese patent CN107794019A describes a composite oil displacement agent that controls the degree of emulsification of the crude oil, for enhancing oil recovery. In this reference, the composite oil displacement agent includes a non-ionic surfactant and an anionic surfactant. The anionic surfactant used herein is sodium alkyl benzene sulfonate and the nonionic surfactant is octylphenol polyoxyethylene ether and/or nonylphenol polyoxyethylene ether.

Non-patent literature report "Crude Oil—Water Interfacial Viscoelasticity in Waterflooding Performance, AIChE Annual Meeting, Nov. 10, 2015" describes an analysis of the interfacial viscoelasticity of oil and low-salinity brine for enhanced oil recovery. The reference mentions that the use of a low concentration (about 100 parts per million) of anionic surfactant with high salinity brine is reported to increase oil recovery by 10%.

Similarly, the non-patent reference "Interfacial Viscoelasticity of Crude Oil/Brine: An Alternative Enhanced-Oil-Recovery Mechanism in Smart Waterflooding, SPE Improved Oil Recovery Symposium, Tulsa, 12-16 Apr. 2014, and subsequently published in SPE Journal, Volume 23, Issue 03, June 2018" describes the correlation between dynamic interfacial viscoelasticity and oil recovery.

Although these methods are useful in improving the rates of oil recovery from oil reservoirs, a large amount of oil is still not recoverable from the oil reservoirs.

Thus, there is a need in the art for a method of extracting oil from a subsurface reservoir by waterflooding, that is capable of a higher efficiency of oil extraction from a subsurface reservoir.

SUMMARY OF THE INVENTION

These and other needs are met by the present invention.

One embodiment of the present invention describes a method of extracting oil from a subsurface reservoir, the method consisting essentially of, accessing the subsurface reservoir by means of a well, injecting a waterflooding composition comprising water and a functional molecule, into the subsurface reservoir through the well, altering the viscoelasticity of the oil-injected water interface; and extracting the oil through the well.

BRIEF DESCRIPTION OF THE DRAWINGS

FIG. 2 illustrates the various experimental conditions used in the examples.

DETAILED DESCRIPTION OF THE INVENTION

Figure 1:
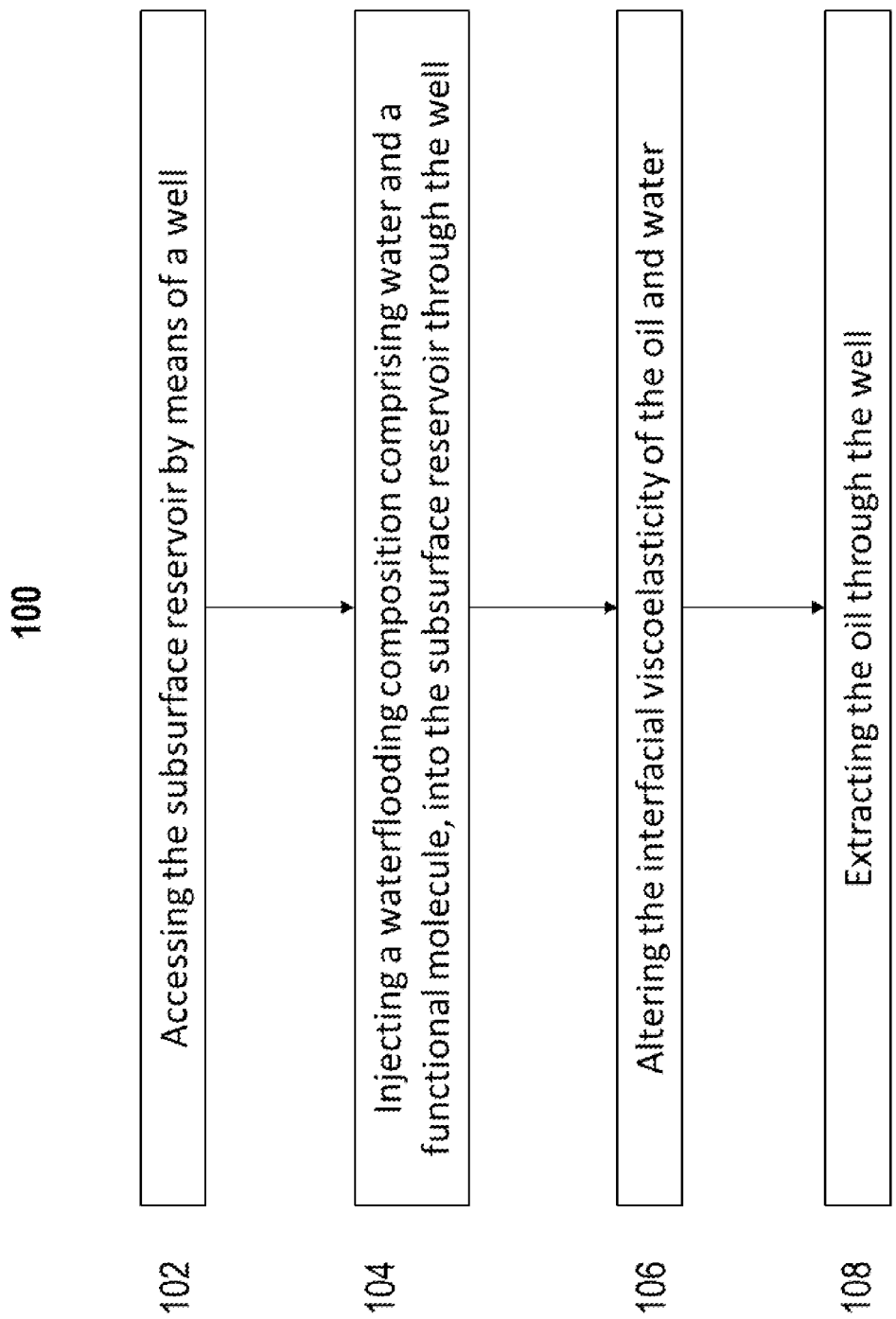
FIG. 1 is a representation of a method of extracting oil from a subsurface reservoir according to an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

In the specification and the claims which follow, reference will be made to a number of terms which shall be defined to have the following meanings:

The singular forms "a", "an" and "the" include plural referents unless the context clearly dictates otherwise. "Optional" or "optionally" means that the subsequently described event or circumstance may or may not occur, and that the description includes instances where the event occurs and instances where it does not. "Substantially" means a range of values that is known in the art to refer to a range of values that are close to, but not necessarily equal to a certain value.

Other than in the examples or where otherwise indicated, all numbers or expressions referring to quantities of ingredients, reaction conditions, and the like, used in the specification and claims are to be understood as modified in all instances by the term "about." In some aspects of the current disclosure, the terms "about" or "approximately" are defined as being close to as understood by one of ordinary skill in the art, and in one non limiting embodiment the terms are defined to be within 10%, alternatively within 5%, alternatively within 1%, or alternatively within 0.5%.

As used herein, the term "substantially" and its variations are defined as being largely but not necessarily wholly what is specified as understood by one of ordinary skill in the art, and in one non limiting aspect substantially refers to ranges within 10%, within 5%, within 1%, or within 0.5%.

Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term "from more than 0 to an amount" means that the named component is present in some amount more than 0, and up to and including the higher named amount.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

As used herein, viscoelasticity of the interface is defined as a property of materials that exhibit both viscous and elastic characteristics when a deforming force is applied to the material.

As used herein phase angle refers to a phase difference between an applied stress and the resultant strain during measurement of interfacial viscoelasticity using a rheometer.

As used herein, a demulsifier refers to a chemical which is used to separate an emulsion into its constituents. In the description below, the demulsifier refers to a chemical which is used to separate an oil-water emulsion into its constituents, namely oil and water.

As used herein, a surfactant refers to a chemical which is used to lower the surface tension or interfacial tension between two liquids, between a gas and a liquid, or between a liquid and a solid.

As used herein, waterflooding or water injection is defined as a process wherein water is injected into the oil reservoir, usually to increase the pressure in the reservoir and thereby stimulate production of oil from the reservoir. The water may or may not contain various additives or synergists that may enhance the production of oil from the reservoir.

One embodiment of the present invention describes a method of extracting oil from a subsurface reservoir, the method consisting essentially of, accessing the subsurface reservoir by means of a well, injecting a waterflooding composition comprising water and a functional molecule, into the subsurface reservoir through the well, altering the interfacial viscoelasticity of the oil and water; and extracting the oil through the well.

Referring now to FIG. 1, according to an embodiment of the present invention, a method 100 of extracting oil from a subsurface reservoir is depicted. The method 100 includes the steps of accessing 102 the subsurface reservoir by means of a well, injecting 104 a waterflooding composition comprising water and a functional molecule, into the subsurface reservoir through the well, altering 106 the viscoelasticity of the oil interface; and extracting 108 the oil through the well.

In an embodiment of the present invention, the waterflooding composition comprises water and a functional molecule.

In an embodiment of the present invention, the waterflooding composition further comprises about 0 ppm to about 80,000 ppm of a salt. In an embodiment of the present invention, the waterflooding composition comprises about 0 ppm of a salt. In an embodiment of the present invention, the waterflooding composition further comprises about 20,000 ppm to about 60,000 ppm of a salt. In an embodiment of the present invention, the waterflooding composition further comprises about 30,000 ppm to about 50,000 ppm of a salt. In an embodiment of the present invention, the waterflooding composition comprises about 40,000 ppm of a salt.

In an embodiment of the present invention, the salt may be an inorganic salt. In an embodiment of the present invention, the salt may be a halide salt. In an embodiment of the present invention, the salt may be a chloride salt. In an embodiment of the present invention, the salt may be an alkali metal salt or an alkaline earth metal salt, and combinations thereof. In an embodiment of the present invention, the salt may be an alkali metal chloride or an alkaline earth metal chloride, and combinations thereof. In an embodiment of the present invention, the salt may be sodium chloride, potassium chloride, magnesium chloride, calcium chloride, strontium chloride and combinations thereof.

In an embodiment of the present invention, the functional molecule is present in a concentration from about 50 ppm to about 250 ppm. In an embodiment of the present invention, the functional molecule is present in a concentration of about 100 ppm.

In an embodiment of the present invention, the functional molecule is a de-emulsifier or a surfactant or combinations thereof. In an embodiment of the present invention, the functional molecule is an ethoxylate resin, a sulfonic acid, an alcohol alkoxylate, an alkoxylate resin, and combinations thereof. In an embodiment of the present invention, the functional molecule is an alkoxylate resin. In an embodiment of the present invention, the functional molecule is an ethoxylate resin. In an embodiment of the present invention, the functional molecule is a sulfonic acid. In an embodiment of the present invention, the functional molecule is dodecylbenzene sulfonic acid. In an embodiment of the present invention, the functional molecule is an alcohol ethoxylate. In an embodiment of the present invention, the functional molecule is an alcohol alkoxylate. In an embodiment of the present invention, the functional molecule is a nonionic alcohol ethoxylate.

In an embodiment of the present invention, the viscoelasticity of the oil-water interface is altered by about 20% to about 80% of the viscoelasticity of the oil before extraction from the subsurface reservoir. In an embodiment of the present invention, the viscoelasticity of the oil-water interface is altered by about 25% to about 75% of the interfacial viscoelasticity before extraction from the subsurface reservoir. In an embodiment of the present invention, the interfacial viscoelasticity is altered by about 30% to about 70% of the interfacial viscoelasticity before extraction from the subsurface reservoir.

In an embodiment of the present invention, the contact angle of the oil is reduced by the addition of the functional molecule. In an embodiment of the present invention, the contact angle of the oil is reduced by about 1° to about 10° by the addition of the functional molecule. In an embodiment of the present invention, the contact angle of the oil is reduced by about 2° to about 7° by the addition of the functional molecule.

In an embodiment of the present invention, the oil is crude oil. In an embodiment of the present invention, the crude oil has a density from about 0.8 g/ml to about 0.95 g/ml. In an embodiment of the present invention, the crude oil has a density from about 0.88 grams per millilitre to about 0.93 grams per millilitre.

In an embodiment of the present invention, the crude oil has a viscosity from about 15 centipoise at 25° C. to about 200 centipoise at 25° C. In an embodiment of the present invention, the crude oil has a viscosity from about 19 centipoise at 25° C. to about 172 centipoise at 25° C.

In an embodiment of the present invention, the well is a horizontal or a vertical well.

In an embodiment of the present invention, the reservoir is a hydrocarbon reservoir.

In an embodiment of the present invention, the reservoir is a carbonate reservoir or a sandstone reservoir.

In an embodiment of the present invention, the subsurface reservoir is a subterranean reservoir or a subsea reservoir.

EXAMPLES

Example 1: A carbonate rock core was saturated with oil. Prior to saturation, the core was cleaned and dried. The core was cleaned by injecting deionized (DI) water and dichloromethane. The core was then placed in a Soxhlet extractor, and extracted with hot toluene followed by an azeotropic mixture of methanol-dichloromethane azeotrope and water. The core was then dried in an oven at a temperature of about 110° C. The core was then saturated with water and aged for a duration of about 24 hours. Oil was injected into the core until no water was released from the core. The core was then pressurized to a pressure of about 100 psi and aged for a period of about 48 hours. The saturated core was then prepared for waterflooding by pressurizing to a pressure of about 200 psi, and maintaining a temperature of about 60° C. The core was then flooded with sea water having a salt concentration of about 40,000 ppm and a demulsifier of concentration of about 100 ppm. (The demulsifier used was Prochinor®, available from Arkema France.) The properties, specifically the density, interfacial viscoelasticity, oil recovery rate, output pressure, and the separation time of the oil and brine mixture so produced as a result of the flooding were recorded. The oil-brine mixture was allowed to stand to enable the oil and brine to separate. It was observed that the mixture separated in about a minute.

Example 2: In this example, a process similar to the above process described in Example 1 was followed, except that instead of using sea water for waterflooding, ordinary water without any salt content was used along with 100 ppm of demulsifier. The demulsifier used herein was Prochinor®, available from Arkema France, as in Example 1.

Example 3: In this example, a process similar to that described in Example 1 was followed, except that the concentration of demulsifier was 200 ppm. The demulsifier used was Prochinor®, available from Arkema France, as in Example 1.

Example 4: In this example, a process similar to that described in Example 1 was followed, except that the concentration of demulsifier was 250 ppm. The demulsifier used was Prochinor®, available from Arkema France, as in Example 1.

Example 5: In this example, a process similar to that described in Example 1 was followed, except that the demulsifier used was Emulsotron X-8672®, available from NALCO Champion Company, USA.

Comparative example 1: A similar procedure as that described in Example 1 was used to prepare the core, inject the oil, and perform waterflooding, except that the core was flooded with water having a salinity of 4%, but no demulsifier was used. The oil-brine mixture was allowed to stand to allow the oil and brine to separate. It was observed that the mixture separated in about a minute.

Comparative Example 2: A similar procedure as that described in example 1 was used to prepare the core, inject the oil, and perform waterflooding, except that the core was flooded with water having no salt content and no demulsifier was used. The oil-brine mixture was allowed to stand to allow the oil and brine to separate. It was observed that the mixture separated in about a minute.

FIG. 2 illustrates the various experimental conditions used in the examples.

It was observed that in the case of Example 1, the amount of emulsion in the water was lesser than that in Comparative Example 1, due to the presence of the demulsifier. However, the demulsifier was observed not to have any effect on the wettability of the rock. The phase angle described in Table 1 is a measure of the interfacial viscoelasticity of the oil. Rheological measurements of the viscoelasticity indicated that addition of demulsifier increased the interfacial viscoelasticity of the oil-water interface. The addition of demulsifier increased the amount of oil recovered by about 10%. In case of Example 2, it was observed that the interfacial viscoelasticity was increased due to addition of the demulsifier. The change in interfacial viscoelasticity improved the efficiency of waterflooding, thereby resulting in enhanced oil recovery. Thus, it was inferred that the change in interfacial viscoelasticity and the increase in oil recovery was due to the presence of the demulsifier, and not due to the presence of the salt in the sea water. It was also observed that addition of the demulsifier also reduced the interfacial tension of the oil by about 80%. It was also observed that addition of demulsifier caused a reduction in the contact angle between oil and water. Addition of the functional molecule resulted in improving the water flooding efficiency by increasing the interfacial viscoelasticity of the oil and water.

It was also observed that in case of Examples 3, 4, and 5, an increase in oil recovery was observed. It was observed that the maximum oil recovery was achieved with sea water having a salinity of about 40,000 ppm and a demulsifier concentration of about 100 ppm.

What is claimed is:

1. A method of extracting oil from a subsurface reservoir, the method consisting essentially of:
    accessing the subsurface reservoir by means of a well;
    injecting a waterflooding composition comprising water and a functional molecule, into the subsurface reservoir through the well, wherein the functional molecule is selected from a demulsifier or a surfactant or combinations thereof, and wherein the functional molecule comprises an ethoxylate resin;
    altering the interfacial viscoelasticity of the oil and water; and
    extracting the oil through the well.

2. The method of claim 1, wherein the waterflooding composition further comprises about 5 ppm to about 40,000 ppm of a salt.

3. The method of claim 2, wherein the salt is sodium chloride, potassium chloride, magnesium chloride, calcium chloride, and combinations thereof.

4. The method of claim 2, wherein the concentration of salt in the waterflooding composition is about 40,000 ppm.

5. The method of claim 1, wherein the functional molecule is present in a concentration from about 50 ppm to about 250 ppm.

6. The method of claim 1, wherein the well is a horizontal well or a vertical well.

7. The method of claim 1, wherein the subsurface reservoir is a hydrocarbon reservoir.

8. The method of claim 1, wherein the subsurface reservoir is a carbonate reservoir or a sandstone reservoir.

9. The method of claim 1, wherein the interfacial viscoelasticity is altered by about 30% to about 70% of the interfacial viscoelasticity before extraction from the subsurface reservoir.

10. The method of claim 1, wherein the subsurface reservoir is a subterranean reservoir or a subsea reservoir.

* * * * *

UNITED STATES PATENT AND TRADEMARK OFFICE
CERTIFICATE OF CORRECTION

PATENT NO. : 11,236,593 B2
APPLICATION NO. : 16/838036
DATED : February 1, 2022
INVENTOR(S) : Abbas Firoozabadi, Mayur Pal and Taniya Kar Page 1 of 1

It is certified that error appears in the above-identified patent and that said Letters Patent is hereby corrected as shown below:

On the Title Page

Please correct:
"(73) Assignee: KASHABLE LLC, New York, NY (US)"
To:
-- (73) Assignee: NORTH OIL COMPANY, Doha (QA) --

Signed and Sealed this
Twenty-sixth Day of April, 2022

Katherine Kelly Vidal
*Director of the United States Patent and Trademark Office*